United States Patent [19]

Assink

[11] Patent Number: 4,567,533
[45] Date of Patent: Jan. 28, 1986

[54] APPARATUS FOR READING A DISK-SHAPED OPTICAL RECORD CARRIER

[75] Inventor: Gerardus J. Assink, Eindhoven, Netherlands

[73] Assignee: U.S. Philips Corporation, New York, N.Y.

[21] Appl. No.: 559,065

[22] Filed: Dec. 7, 1983

[30] Foreign Application Priority Data

Aug. 31, 1983 [NL] Netherlands ............... 8303029

[51] Int. Cl.[4] .................................... H04N 5/781
[52] U.S. Cl. ................................ 358/342; 358/907
[58] Field of Search .............. 358/321, 342, 907; 369/43, 44, 111, 32, 33

[56] References Cited

U.S. PATENT DOCUMENTS

| Re. 29,963 | 4/1979 | Janssen | 358/342 |
| 3,854,015 | 12/1974 | Janssen | 358/342 |
| 4,057,832 | 11/1977 | Kappert | 369/44 |
| 4,106,058 | 8/1978 | Romeas et al. | 369/32 |
| 4,138,663 | 2/1979 | Lehureau et al. | 369/44 |
| 4,236,232 | 11/1980 | Janssen et al. | 369/44 |
| 4,330,880 | 5/1982 | Van Dijk | 369/32 |
| 4,432,082 | 2/1984 | Hsieh et al. | 369/32 |

*Primary Examiner*—Donald McElheny, Jr.
*Attorney, Agent, or Firm*—Robert T. Mayer; Algy Tamoshunas

[57] ABSTRACT

The invention relates to an apparatus for reading an optical record carrier. During a search mode when an optical read unit is rapidly moved in a radial direction. By means of a control circuit a servo control loop is rendered operative and inoperative by a control circuit in accordance with a predetermined periodic pattern. By means of a deflection element in the optical read unit, the servo control loop controls the scanning position of the read spot on the record carrier. During a fast search operation, the control circuit defines the operative period of the servo control loop in such a way that the address signals recorded in the vertical flyback periods of the video signal are read with a high reliability.

4 Claims, 4 Drawing Figures

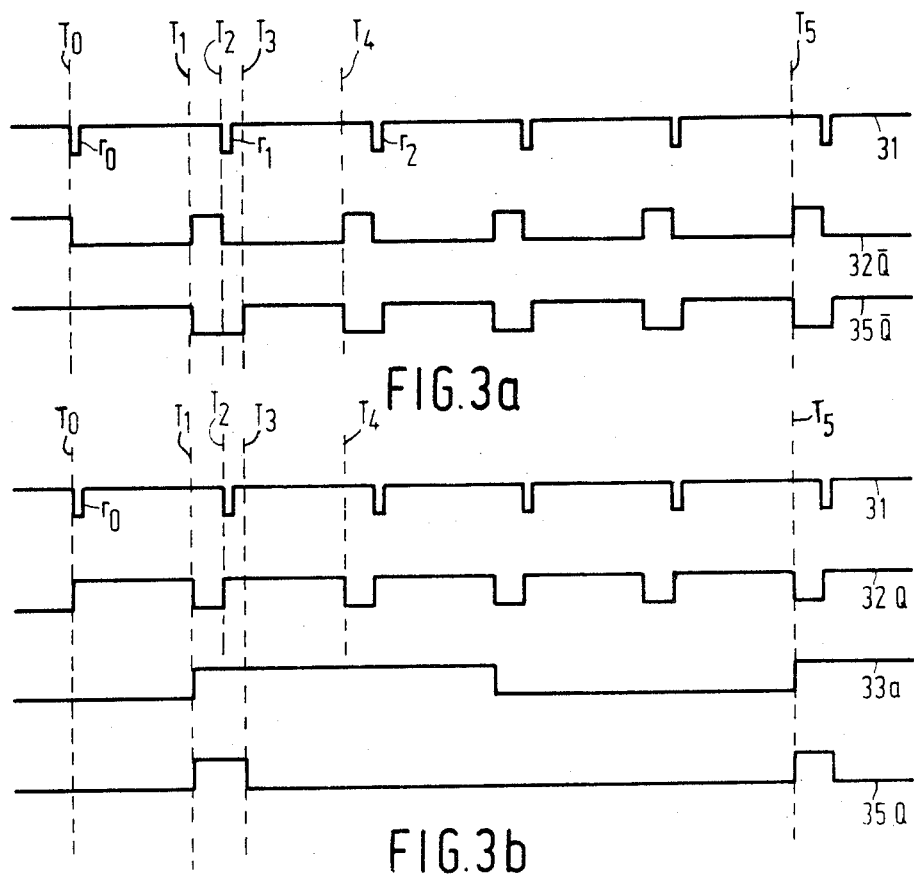

APPARATUS FOR READING A DISK-SHAPED OPTICAL RECORD CARRIER

BACKGROUND OF THE INVENTION

The invention relates to an apparatus for reading a disk-shaped record carrier on which video information is recorded in accordance with an optically detectable structure in substantially parallel tracks. Such an apparatus comprises an optical read unit comprising a read detector for detecting the information contained in a read beam after co-operation with a record carrier and a deflection element which cooperates with the read beam to vary the radial scanning position on the record carrier, and, in response to a control signal, is movable in two opposite directions relative to a center position. The apparatus further comprises a drive means for radially moving the optical read unit and a servo control loop for controlling the radial scanning position on the record carrier. The servo control loop includes the deflection element and a measuring detector for measuring the radial deviation of the scanning position relative to desired track and for deriving therefrom the control signal for the deflection element. The servo control loop also has switching means for rendering the loop inoperative during controlled time intervals and an actuating device for causing the deflection element to move at least towards the center position during said time intervals.

Such apparatus is disclosed in U.S. Pat. No. 4,330,880. The apparatus disclosed in said Patent enables a desired program section on the record carrier to be located rapidly while maintaining at least a reasonable picture reproduction during this search operation.

In addition to the visual search for a desired program section, a desired program section on such record carriers can also be located automatically. The video pictures recorded on such a record carrier generally have an individual picture number, which is inserted as a digital signal in the vertical flyback period of the video signal. This means that by keying-in a picture number, an automatic-search operation can be started, a control signal for the drive means of the optical read unit being obtained by comparing the number of the picture being read instantaneously with the desired picture number, so that said read unit can be moved very rapidly to the desired radial position to read the desired video picture. During this search operation, when very rapid movements of the optical read element may occur, it is no longer important to maintain the picture reproduction. However, during the search operation it is important that information about the position of the scanning spot on the record carrier is available.

SUMMARY OF THE INVENTION

The object of the invention is to provide an apparatus of the type mentioned in the opening paragraph in which this information about the position of the scanning spot remains available in a reliable manner during said automatic search operation.

The invention also aims at providing an apparatus by means of which this object is achieved and which enables a serach operation to be performed in a very simple manner while maintaining the picture reproduction.

To this end the invention is characterized in that the apparatus is provided with a control circuit having an input which is coupled to the read detector and an output which is coupled to the switching means. The control circuit serves for the detection of field pulses being read or a synchronizing signal in the video signal, which synchronizing signal is time-correlated to said pulses, and for supplying a periodic control signal to the switching means for alternately rendering the servo control loop operative and inoperative, the phase of said periodic control signal having a predetermined relationship with a field pulse which initiates said control signal.

The invention firstly provides the possibility of reading the picture numbers in a reliable manner during an automatic search operation.

To this end the apparatus in accordance with the invention may be characterized in that the control circuit is adapted to render the servo control loop operative at an instant which appears not later than one field period after detection of a field pulse.

This ensures that after detection of a field pulse, the servo loop is closed again before the appearance of the next field pulse, so that the information track is followed again. This means that said field pulse and the address signal recorded in the corresponding vertical flyback period are read correctly with a high reliability. By triggering the control circuit, the field pulse thus read ensures that before the appearance of the next field pulse the servo loop is closed again and the associated address signal is read etc.

This means that during such a search operation the address signals are read periodically with a high reliability, so that it is always known on which track the scanning spot is located instantaneously, which is essential for the control of the actuating device of the optical read element.

For carrying out a visual search operation the invention is characterized in that the control circuit is adapted to render the servo control loop operative for a time interval which covers a plurality of field periods and to render said servo control loop inoperative in a consecutive time interval whose length at least substantially corresponds to one vertical flyback period of the video signal.

Since the radial speed with which the optical read unit is moved during a visual search operation is substantially smaller than during an automatic search operation, the intervals in which the servo control loop is closed may be substantially longer. Since in accordance with the invention the interval in which said servo control loop is inoperative at least substantially coincides with a vertical flyback period of the video signal, the disturbance of the picture reproduction occurring in this interval at least for a substantial part falls outside the picture being reproduced and is therefore hardly noticeable.

BRIEF DESCRIPTION OF THE DRAWINGS

The invention will now be described in more detail, by way of example, with reference to the drawings, in which FIGS. 3a and 3b represent the signals appearing in this circuit.

DESCRIPTION OF THE PREFERRED EMBODIMENTS

Figure 1:
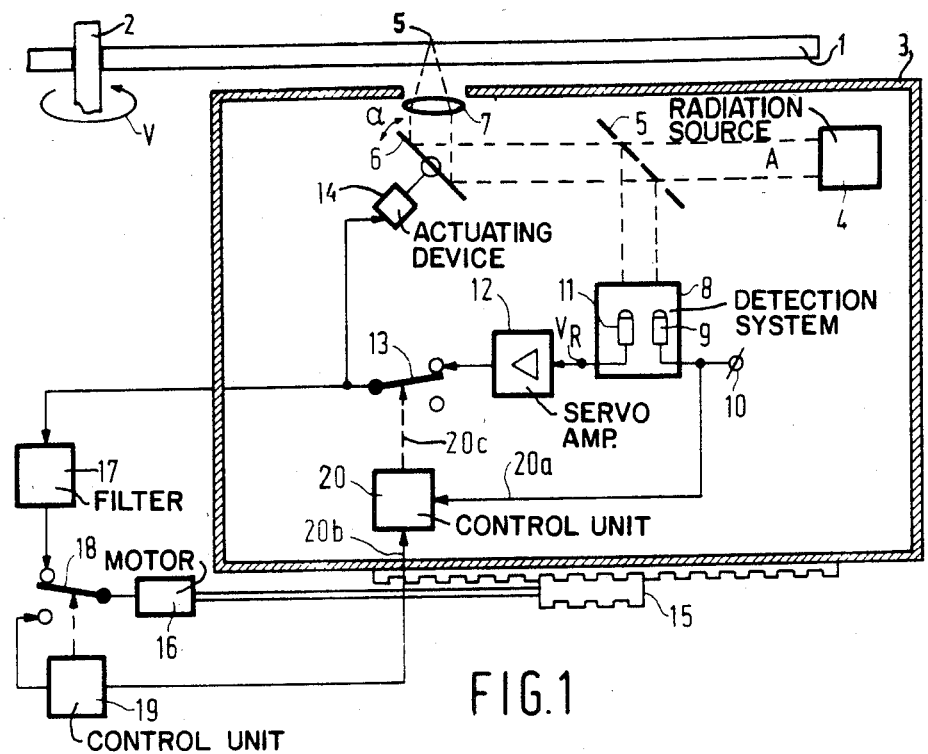
FIG. 1 shows an embodiment of the invention.

The apparatus shown in FIG. 1 comprises a spindle 2 which extends through a central aperture in a disk-shaped record carrier 1 and rotates said record carrier in a direction V. It is assumed that this record carrier 1 has information tracks on its upper surface, which upper surface is a reflecting surface, and that the record carrier material itself is transparent, so that this record carrier can be read by means of an optical read unit which is situated underneath the record carrier.

This optical read unit is accommodated in a housing 3 and comprises a radiation source 4, which produces a read beam A. The read beam A is directed to the record carrier 1 via a semi-transparent mirror 5, a deflection element 6, in the form of a mirror, and a lens system 7 which focuses the beam so as to form a scanning spot S. The beam which has been reflected by the record carrier is subsequently directed towards a detection system 8 via the lens system 7, the mirror 6 and the semi-transparent mirror 5. The detection system 8 is shown only schematically and comprises a read detector 9 for detecting the video information contained in the radiation beam, which video information becomes available for further processing on a signal terminal 10.

Moreover, the detection system 8 comprises a measuring detector 11 for measuring the deviation of the radial scanning position of the scanning spot S relative to the desired track. The error signal supplied by this measuring detector 11 is supplied to an actuating device 14 via a servo amplifier 12 and the switch 13, which is normally in the closed position as shown in FIG. 1. The actuating device 14 determines the angular position of the mirror 6 and may comprise, for example, a moving-coil drive, a number of filamentary windings arranged on the mirror and disposed in a magnetic field, thereby enabling the angular position of the mirror to be varied against a spring force by applying a current to said windings. Via the radiation beam A, the measuring detector 11, the servo amplifier 12, the actuating device 14 and the mirror 6 form a closed servo-control loop which ensures that the scanning spot S always coincides with the information track.

The housing 3, which contains the optical read unit, can be moved in a radial direction by means of a gear-rack combination 15, which is driven by a motor 16. The motor 16 receives a control signal which is derived from the control signal for the actuating device 14, for example via a low-pass filter 17. Thus, during normal scanning of the record carrier 1, an automatic correction is applied to the radial position of the read unit in dependence on the average deflection of the mirror 6.

The apparatus described so far is identical to the apparatus described in U.S. Pat. No. 3,854,015. This patent also describes some possibilities for obtaining a suitable control signal in the servo control loop by means of the measuring detector 11 and alternative versions of the actuating device 14. Since the manner in which said control signal is obtained is irrelevant to the present invention and a number of solutions for this are described in the literature, this subject will not be dealt with in more detail.

In order to enable a desired program section to be located rapidly, a switch 18 is arranged between the filter 17 and the motor 16, which switch normally occupies the position shown. During rapid search for a desired program section, the switch 18 is changed over by means of a control unit 19, so that the motor 16 no longer receives a control signal from the filter 17. Via the control unit 19 and the switch 18, motor 16 now receives a control signal such that the read unit is rapidly moved in the desired direction.

In accordance with the invention, the apparatus further comprises a control circuit 20, which controls the switch 13. If switch 13 is in the closed position shown, the servo control loop, which comprises the measuring detector 11, the servo amplifier 12 and deflection element comprising the mirror 6 and the actuating device 14, is closed, which means that the scanning spot S remains centered on the information track.

If a search operation is started via the control unit 19, i.e. if upon change-over of the switch 18, the read unit 3 is moved rapidly in the radial direction, the servo control loop tends to cancel the radial movement of the scanning spot 5 caused by the movement of the read unit 3 through a gradually increasing deflection of the mirror. Since the control range of mirror 6 is obviously limited, this is only possible to a limited extent and soon the instant will be reached at which the radial tracking control is no longer effective and the scanning spot is no longer centered on the information track.

In accordance with the invention, the periods during which said servo control loop is operative and inoperative are defined in a controlled manner. This will be explained with reference to FIG. 2, which shows a version of the control circuit 20, and FIG. 3, which shows the signals appearing in said control circuit during the various search modes.

The operation of the control circuit 20 will be described for a fast search operation, i.e. a search operation in which it is not necessary that the picture reproduction be maintained but for which it is important that the address signals contained in the video signal are read in a reliable manner. In general, exactly one video picture, i.e. two video fields, is recorded per track circumference on disk-shaped record carrier for which such fast, and if necessary automatic, search operations are required. The address signals, which characterize one video picture, are recorded at least once per video picture, in a vertical flyback period, for example the vertical flyback period, preceding the first field of each video picture. Obviously every vertical flyback period may contain an address signal. With such record carriers, which are of course rotated with a constant speed during reading, the time interval between consecutive field pulses is known, also when the scanning spot is moved rapidly over the tracks in the radial direction during a search operation. For the European television standard this time interval is 20 msec, which will be adopted hereinafter for explaining the invention.

Figure 2:
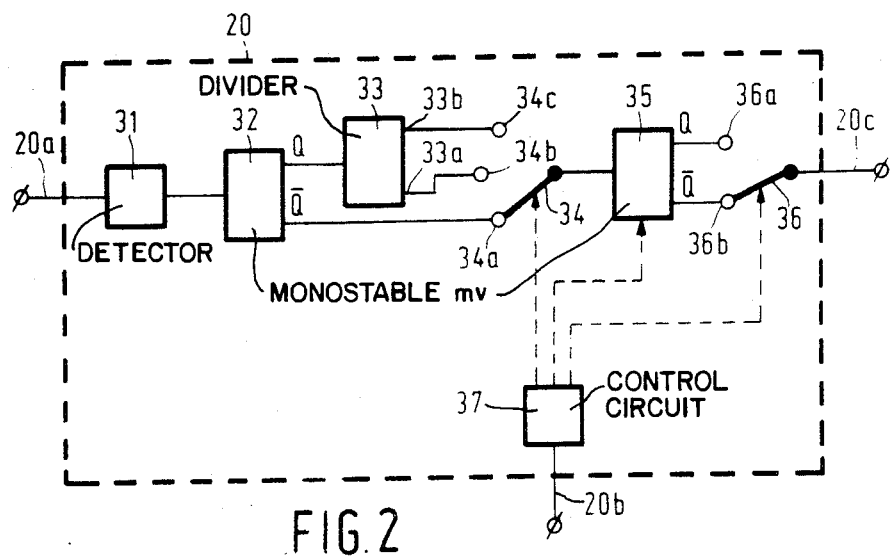
FIG. 2 shows an example of the control circuit used therein.

The version of the control circuit 20 used in the apparatus in accordance with the invention as shown in FIG. 2 comprises an input terminal 20a, which is connected to the read detector 9 (see FIG. 1). The control circuit 20 further comprises a detector 31 for detecting field pulses in the video signal being read. The field pulses detected by the detector 31 are applied to a monostable multivibrator 32, having a relaxation time which is slightly shorter than one field period, for example 16 msec. Preferably, the monostable multivibrator 32 is not of the retriggerable type, i.e. it cannot be retriggered within the relaxation time, for example by a spurious pulse. The non-inverting output Q of the monostable multivibrator 32 is connected to a divider stage 33 which supplies two signals to two outputs 33a and 33b respectively, which signals have a repetition frequency which is a factor $2^2$ and $2^8$, respectively, lower than the repetition frequency of the field-pulse train. Two input terminals 34b and 34c of a switch 34 are connected to said outputs 33a and 33b, respectively, of said divider stage 33, a third input terminal 34a being connected to the inverting output $\bar{Q}$ of the monostable multivibrator 32. The master contact of switch 34 is connected to the input of a monostable multivibrator 35 having a relaxation time of approximately 6 msecs. The non-inverting output Q and the inverting output $\bar{Q}$ are connected to two input terminals 36a and 36b, respectively, of a switch 36, whose master contact is connected to the output terminal 20c of the control circuit 20. Output terminal 20c is coupled to the switch 13 for interrupting the servo control loop (see FIG. 1). Two switches 34 and 36 are controlled by a circuit 37 having a control input 20b which is connected to the control unit 19 (see FIG. 1). Moreover, this circuit 37 supplies a control signal to the monostable multivibrator 35, which signal ensures that monostable multivibrator 35 is active only during one of the modes described hereinafter.

During a fast search operation in which the picture reproduction is not maintained, the circuit 37 sets the switches 34 and 36 to the positions shown. The signal waveforms appearing in the control circuit during said fast search operation are shown in FIG. 3a.

Assuming that the fast search operation is started soon after the instant t0, the monostable multivibrator 32 will have been triggered already at this instant by the field pulse ro detected at the instant t0. The inverting output $\bar{Q}$ of multivibrator 32 is consequently "0" at the instant t0 and it returns to "1" after the relaxation time of approximately 16 msecs at the instant t1. This rising edge at the instant t1 triggers the monostable multivibrator 35, so that the inverting $\bar{Q}$ of this monostable multivibrator becomes "0" from the instant t1 for a time interval of approximately 6 msecs. until the instant t3. The output signal of the monostable multivibrator 35 is applied to the switch 13 via the output terminal 20c (FIG. 1), so that during the time interval t1-t3, the servo control loop is closed and the scanning spot follows the information track during these periods.

The relaxation time of the monostable multivibrator 32 has been selected so that the instant t1 precedes the instant t2 at which the appearance of the next field pulse r2 is anticipated, which is 20 msecs. after the appearance of the field pulse r0. A margin has been adopted in order to ensure that at the instant t1 the servo control loop will have positioned the scanning spot correctly on the information track, which obviously demands some time after the closure of the servo control loop at the instant t1. The relaxation time of the monostable multivibrator 35 has been selected in such a manner that the servo control loop remains closed until after the instant at which the address signal recorded in the vertical flyback period associated with the field pulse r1 may be expected.

During the time interval t1-t3 the servo control loop is closed and consequently the scanning spot is centered on the information track. This ensures that the field pulse r1 and the associated address signal are read correctly. The read-out address signal provides an indication of the radial distance covered in the time interval t0-t1. Thus, by applying this address signal to the control unit 19 (FIG. 1) the progress of the search operation can be controlled. Obviously this address signal may also be reproduced.

At the instant t3, the servo control loop is rendered inoperative. If a deflection element is used which comprises a mirror which is pivotable against spring force from a center position this deflection element will return to its center position from this instant.

The field pulse r1 read at the instant t2 triggers the monostable multivibrator 32, which results in the servo control loop being closed again at an instant t4 preceding the instant at which the next field pulse is expected to appear.

Obviously, the afore-mentioned 6-msec. relaxation time of the monostable multivibrator 35 has been determined with a view to the time during which the deflection element can keep the scanning spot centred on the information track for the selected radial speed of the optical read unit. That time depends on the maximum possible deflection of the deflection element and the radial speed of the optical read unit. If the maximum deflection of the deflection element and said relaxation time have been selected correctly for the maximum possible speed of the read unit, the system will also operate correctly at lower radial speeds of the read unit.

FIG. 3b shows the signal waveforms which appear if the apparatus in accordance with the invention is set to the search mode in which the picture reproduction is maintained. During this search operation the optical read unit is moved with a substantially lower radial speed than during the fast search operation described with reference to FIG. 3a. This means that the time intervals in which the servo control loop may be closed are substantially longer, so that the picture reproduction remains possible.

In the control circuit shown in FIG. 2 this search mode is started in that the control unit 19 (FIG. 1) sets the switch 34 to position 34b and the switch 36 to position 36a via the circuit 37.

Referring now to FIG. 3b, it can be seen that a first field pulse ro detected just before the start of the search operation, triggers the monostable multivibrator 32. The output Q of this multivibrator is connected to the divider stage 33, which is driven by the negative-going edges of the input signal. In, the search mode this divider stage 33 has a divisor of $2^2$, so that on its output 33a a signal appears as shown in FIG. 3b, which signal has a period corresponding to four field periods. This signal is applied to multivibrator 35, which is triggered by the positive-going edges of the signal and whose output produced on the non-inverting output 35Q is available on output terminal 20c for controlling the switch 13 in the radial servo-control loop. This output signal 35Q firstly ensures that the servo control loop is rendered inoperative for comparatively short periods, for the first time during the interval t1-t3, which interval has a length equal to the relaxation time of multivibrator 35. The next interval t3-t4, in which the servo control loop is closed, i.e. is inoperative, is approximately 4 field periods, during which time interval the video signal is read so that an undisturbed picture reproduction is possible. Since the time interval in which the servo control loop is inoperative substantially coincides in time with a vertical flyback period the disturbance of the picture reproduction, which occurs in this interval, is hardly visible, i.e. at the most gives rise to some disturbance in the lower and upper picture lines of a video picture being reproduced.

FIG. 2 finally illustrates the possibility of a third scanning mode, the so-called pause mode. In this pause mode the optical read unit is stationary. By means of the control circuit 20 the servo control loop is then alternately rendered operative and inoperative. Since the read unit is stationary the time interval during which the servo control loop is operative can be substantially longer than in the search modes described in the foregoing. This is achieved by setting the switch 34 to position 34c, so that output 33b of the divider stage 33 is coupled to the monostable 35. The divider stage 33 supplies a signal on said output 33b, which corresponds to its input signal divided by $2^8$. As a result of this the servo control loop is alternately rendered inoperative for a time of 6 msec and operative for a time corresponding to 256 field periods. Thus, in this pause mode the same scene of 256 video fields can be reproduced repeatedly. If desired, the picture reproduction during this pause mode may be suppressed. The principal function of this pause mode is to keep the scanning spot positioned on the same part of the record carrier.

It is obvious that some refinements are possible to the system described in the foregoing. For example, in the present embodiment during the search operation with picture reproduction the time interval for which the servo control loop is interrupted is 6 msecs, which is caused by the fact that the control circuit required for this purpose has been derived from the control circuit for the fast search mode with a minimal number of additions. It is obvious that if for specific uses the time interval in which the servo control loop is inoperative must be different, this is possible by the use of an additional monostable multivibrator.

When the servo control loop is switched on again after an inoperative period it is important that the scanning spot is re-centered on the information track as rapidly and as reliably as possible. Possible methods of achieving this are described in the aforementioned U.S. Pat. No. 4,330,880, in particular FIG. 5. For the circuit arrangement to be used for this purpose reference is therefore made to said United States Patent, which is herewith incorporated by reference.

Versions of the deflection element to be used in the apparatus in accordance with the invention can be found in U.S. Pat. No. Re. 29,963, which is also herewith incorporated by reference.

The manner in which the address signals are recorded on the record carrier during the vertical flyback periods of the video signal is irrelevant to the present invention. This may for example be done in the same way as in the commercially available disk-shaped video records of the "Laservision" type.

In the embodiment of the invention as described herein it is assumed that the control circuit detects field pulses. Instead of said field pulses it is obviously possible to use another synchronizing signal which is time correlated to the field pulses. For example, it is possible to detect the line pulses. By means of a counter it is then possible to derive pulses which are spaced one field period apart. By synchronizing this counter with a field pulse it is thus possible to obtain a pulse train which in fact coincides with the field-pulse train.

What is claimed is:

1. An apparatus for reading a disk-shaped record carrier containing a video signal recorded in generally parallel tracks, said apparatus comprising:
   an optical read unit, said read unit including means for projecting a read beam of radiation onto said record carrier so as to read the video signal recorded in said tracks, a deflection element for varying the position of the said read beam on said record carrier in a direction transverse to the direction of said tracks, said deflection element being movable in two opposite directions relative to a center position in response to a control signal, means for deriving the video signal from said read beam after cooperation with said record carrier, and means for measuring radial deviation of said read beam relative to a desired track, said measuring means producing said control signal in dependence on said radial deviation measured thereby,
   means for radially moving said read unit relative to said record carrier,
   a servo control loop for controlling the radial position of said read beam on said record carrier, said control loop including said deflection element and said measuring means and further comprising switching means for rendering said servo control inoperative during controlled time intervals and means for moving said deflection element at least towards said center position during said controlled time intervals, and
   means for controlling said switching means, said controlling means including means, coupled to said deriving means, for detecting field pulses or synchronizing signals in the video signal read from said record carrier, which synchronizing signals are time correlated to said pulses, and means for generating, in response to a given field pulse or synchronizing signal detected by said detecting means, a periodic signal which controls said switching means so as to alternately render said servo control loop operative and inoperative in a predetermined relationship with said given pulse or synchronizing signal in response to which said periodic signal is generated.

2. The apparatus according to claim 1 wherein said controlling means controls said switching means so that said servo control loop is rendered operative at an instant which is not later than one field period after detection of a field pulse.

3. The apparatus according to claim 2 wherein the video signal includes, in a vertical flyback period, an address signal which follows a field pulse and said controlling means controls said switching means so as to render said control loop operative for a time interval which is longer than the time interval between the beginning of the field pulse and the end of the address signal.

4. An apparatus as claimed in claim 1, wherein said controlling means controls said switching means so as to render said servo control loop operative for a time interval which covers a plurality of field periods and to render said servo control loop inoperative in a consecutive time interval whose length at least substantially corresponds to one vertical flyback period of the video signal.

* * * * *